United States Patent [19]

Nicholas

[11] Patent Number: 5,296,870
[45] Date of Patent: Mar. 22, 1994

[54] MATRIX DISPLAY DEVICES

[75] Inventor: Keith H. Nicholas, Reigate, England

[73] Assignee: U.S. Philips Corporation, New York, N.Y.

[21] Appl. No.: 680,022

[22] Filed: Mar. 28, 1991

Related U.S. Application Data

[63] Continuation of Ser. No. 408,415, Sep. 14, 1989, abandoned, which is a continuation of Ser. No. 130,368, Dec. 8, 1987, abandoned.

[30] Foreign Application Priority Data

Dec. 19, 1986 [GB] United Kingdom ............... 8630410

[51] Int. Cl.$^5$ .................................................. G09G 3/36
[52] U.S. Cl. .................................. 345/89; 345/149
[58] Field of Search .................. 340/784, 793, 767; 350/333, 350 S; 358/455, 456, 457, 458, 459; 359/36, 54, 55, 56, 58, 59; 345/89, 149

[56] References Cited

U.S. PATENT DOCUMENTS

| | | | |
|---|---|---|---|
| 3,647,958 | 3/1972 | Sobel | 350/333 |
| 4,661,809 | 4/1987 | Anderson et al. | 340/793 |
| 4,712,877 | 12/1987 | Okada et al. | 340/784 |
| 4,747,671 | 5/1988 | Takahashi et al. | 350/350 S |
| 4,791,417 | 12/1988 | Bobak | 340/793 |

OTHER PUBLICATIONS

Robert L. Shrader, "Electronic Communication", copyright 1959, pp. 115-121.
"The International Dictionary of Physics and Electronics", copyright 1961, p. 177.

Primary Examiner—Richard Hjerpe
Attorney, Agent, or Firm—John C. Fox

[57] ABSTRACT

A matrix display device, suitable for displaying TV pictures, has a plurality of display elements (20) arranged in a matrix array and defined by electrodes (33 and 41) on opposing substrates with, for example, liquid crystal material (32) therebetween and with the display elements being individually controllable via switching elements (40) such as thin film transistors. Each display element is sub-divided into a plurality of sub-elements using a plurality of sub-electrodes (55) on one substrate which are each connected via a series capacitor ($C_X$) to a switching element, the ratio of capacitances of the sub-elements to their respective series capacitors differing from one another. As applied voltage is increased, progressively more sub-elements are caused to change state providing in effect various grey scale levels. Display materials having comparatively sharp switching characteristics can be used.

20 Claims, 4 Drawing Sheets

MATRIX DISPLAY DEVICES

This is a continuation of application Ser. No. 408,415, filed on Sep. 14, 1989, now abandoned, which is a continuation of application Ser. No. 130,368, filed Dec. 8, 1987, now abandoned.

BACKGROUND OF THE INVENTION

This invention relates to a matrix display device comprising a plurality of display elements arranged in a matrix and defined by respective electrodes carried on opposed substrates between which is disposed an electrically excitable display material which, together with the electrodes, exhibits capacitance in operation, and in which the display elements are controlled by selectively applying voltage to the respective electrodes via respective switching means carried on one substrate.

In a known example of such a display device in which the electrically excitable display material comprises liquid crystal material, each display element is defined by a respective electrode carried on the one substrate and an opposing portion of an electrode common to all display elements carried on the other substrate. The switching means comprise thin film transistors (TFTs) and are arranged in an array of rows and columns. A plurality of data lines are each connected to a respective column of the TFTs and a plurality of gate lines are each connected to a respective row of the TFTS.

The device is driven by repetitively scanning the gate lines in sequential fashion so as to turn on all TFTs in each row in turn and applying picture (data) signals to the data lines for each row in turn so as to build up a display picture. When each line of TFTs is turned "on", the TFTs in that line form conductive paths between the data lines and the one electrode of each of the display elements of that line which thus charge up to the applied data voltage. When the gate line voltage falls at the termination of energisation of that line, the TFTs in that line are all turned "off". This isolates the display element electrodes and charge is stored on each display element in view of the inherent capacitance of the display element structure although storage capacitors may also be used. The display elements stay in the state into which they were driven, determined by the applied data voltage, until the next time the associated TFTs are turned on, in the case of TV signals, this being every field period.

This kind of display device may be used for data graphic purposes or to display TV pictures by sampling each line in the video signal and placing the appropriate voltages on the data lines.

Particularly when the display device is being used to display TV pictures, a grey scale capability is needed. In known devices this is achieved in practice utilising the display element's transmission/voltage characteristic and by adjusting the voltage applied across each display element accordingly. The liquid crystal material employed is chosen to have a voltage switching characteristic that exhibits an exponential slope and varies slowly with voltage applied thereacross. This necessary restriction on the kind of liquid crystal matter used to one having a gradual switching characteristic also results in limitations of other properties of the material such as viewing angle in particular.

SUMMARY OF THE INVENTION

It is an object of the present invention to provide a matrix display device, and particularly a liquid crystal display device, in which grey scale levels can be readily achieved and in which the aforementioned drawback associated with known devices is avoided at least to some extent.

According to the present invention, there is provided a matrix display device comprising a plurality of display elements arranged in a matrix and defined by respective electrodes carried on opposed substrates between which is disposed an electrically excitable display material which, together with the electrodes, exhibits capacitance in operation, and in which the display elements are controlled by selectively applying voltage to the respective electrodes via respective switching means carried on one substrate, characterized in that the display element electrodes associated with the switching means on the one substrate each comprise a plurality of separate electrodes defining sub-elements, which separate electrodes are each capacitively coupled to the switching means by means of a series capacitor, and in that the ratios of the capacitances of the sub-elements and their respective series capacitors differ from one another.

Such a display device avoids the need to use a particular electro-optical display material, for example a liquid crystal material, which has a gradual switch requirement, that is, a gradual change from one state to another. Other electro-optical materials can be employed so that the restrictions on various other properties associated with the use of a particular material having a gradual switch requirement can be removed.

This advantage stems from the fact that each display element is in effect spat into a plurality of sub-elements (i.e. sub-regions), defined by the plurality of electrodes, having different thresholds. Each display element is capable of displaying a range of grey scale levels, the levels being dependent on the number of sub-elements having been switched to a visibly different state which in turn is determined by the number of the separate electrodes of each display element having attained or exceeded the switching voltage of the display material. Because the capacitance ratios of the sub-elements of the display element and their respective series capacitors differ, the number of the sub-elements attaining the required switching voltage varies in accordance with the voltage supplied via the switching means. Each series-connected capacitive sub-element and associated capacitor acts in effect as a capacitive potential divider circuit and the plurality of such circuits can be regarded as connected in parallel with one another between the terminals of a source of applied voltage. A certain level of applied voltage is required to cause a threshold voltage to be reached across each one of the sub-elements. As the applied voltage is increased, the number of sub-elements switched, that is, caused to change state by virtue of the threshold being attained, and hence the proportion of the display element total area turned "on" is correspondingly increased. The area of each of the display elements is small, so that, under typical viewing circumstances, a viewer cannot distinguish its sub-elements separately and instead perceives the display element as a dot whose relative brightness, corresponding to grey scale level, varies proportionately in accordance with the number of sub-elements switched. As a result, different grey-scale levels can be achieved in accordance with applied voltage. In this respect, and considering the case where, for example, the display material comprises liquid crystal material which is capable of being switched between a state presenting a light appearance to a state presenting a dark appearance to a viewer upon the application thereacross of a threshold voltage, as the number of the plurality of electrodes of each display element attaining the threshold voltage increases the display element darkens, and, conversely, as the number decreases, the display element lightens.

In an embodiment of the invention, the display material comprises liquid crystal material. The advantages afforded by the invention when applied to liquid crystal display devices are particularly beneficial. Because of the manner in which grey-scale capability is achieved, the liquid crystal voltage characteristics are less critical and the invention enables liquid crystal materials other than those demonstrating a gradual switching requirement to be used offering a wider choice of other properties than previously. Hence materials capable of giving in operation improved viewing angle characteristics may be utilised if desired. Preferably, however, the liquid crystal material chosen has a voltage switching characteristic which is reasonably sharp.

It is envisaged that the invention might also be used with similar advantages in display devices using other electro-optical, electrically excitable, display materials and exhibiting a capacitance effect in operation, for example, an electroluminescent or electrochromic material.

In the case, for example, where the switching means of the display device comprise TFTS, the invention offers a further advantage in that as each display element is constituted by a plurality of separate sub-elements defined by respective ones of a plurality of electrodes, each being connected in series with a further capacitor, the overall capacitance of a display element compared with that of a known kind of display device using single electrodes defining each display element of equivalent size is smaller and hence the size of the TFTs necessary could be reduced allowing the ratio of the display element area to TFT area to be increased.

The number of the plurality of sub-elements, and accordingly the number of the plurality of electrodes, is preferably chosen in accordance with the number of grey scale levels to be displayed. Typically, for TV picture displays, sixteen grey scale levels are desirable and in this case fifteen sub-elements may be provided for each display element, the sixteenth grey scale level being provided by the display element being on its fully "off" condition.

In addition to the plurality of sub-elements, each display element may include a further one or more sub-elements which are similarly capacitively coupled by means of a series capacitor to the switching means with the ratios of the capacitances of these further sub-elements and their respective series capacitors being the same as one or respective ones of those ratios associated with the plurality of sub-elements. When therefore a certain voltage is applied which is sufficient to switch one of the plurality of sub-elements, one or more of the further sub-elements may in addition be switched. In this way, a single grey scale level may be provided by more than one sub-element of the display element. The provision of such further sub-elements can serve in obtaining the desired grey scale levels so that rather than relying solely on the switching of a particular one of the plurality of sub-elements to achieve a different grey scale level, the different grey scale level may be obtained by one or more of these further sub-elements being switched simultaneously with that particular sub-element.

While the invention is capable of offering a useful range of grey scale levels, further and intermediate grey scale levels could additionally be achieved if desired by utilising at the same time the display material's switching characteristics as previously, assuming the material chosen has the necessary properties in this respect, to give a combination grey scale effect. Its switching characteristics need not be as gradual as those required in the known devices and can be significantly sharper.

In order to provide a desirable grey scale level variation, as perceived by a viewer of the display device, in a convenient manner, the respective areas of the plurality of electrodes of each display element, and hence the respective areas of the sub-elements they serve to define, preferably vary with respect to one another in accordance with grey scale levels to be perceived. As an approximation, the human eye's characteristic response to brightness level variations is generally logarithmic.

In this case, the respective areas of the plurality of electrodes of successively switched sub-elements are therefore preferably chosen to have an approximately logarithmic relationship, thus matching the sub-elements to the eye's perception of linear grey scale.

With the sizes of the areas of the plurality of electrodes differing in this manner, the capacitances of the sub-elements defined thereby will likewise differ as a consequence. Therefore it is necessary to determine the value of the capacitance of the capacitors in series with the sub-elements so that the required differences between the ratios of the capacitances of the sub-elements and their series capacitors are obtained.

In an embodiment of the invention, in which liquid crystal material may be used as the display material, the series capacitors associated with the sub-elements of each display element are connected to the output of one common switching means, for example, a thin film transistor. The plurality of electrodes of each of the display elements are arranged in a planar array and are each connected to a respective conductive layer, constituting part of their series capacitor, which conveniently may be formed as an extension of the electrode and integrally therewith, adjacent to the periphery of the display element. The output electrode of the switching means is connected to a conductive strip which extends over the conductive layers associated with the plurality of electrodes and is insulated therefrom, the conductive layers and the respective overlying portions of the conductive strip constituting the series capacitors. For convenience, the conductive strip may be formed of substantially constant width and the capacitance value of each series capacitor is determined by the area of its conductive layer lying under the strip. Where the display element is generally rectangular, the aforementioned conductive strip preferably extends adjacent two edges of the display element, this configuration facilitating arrangement of the plurality of electrodes.

In an alternative embodiment, a plurality of separate switching means, for example thin film transistors, are provided for each display element, the outputs of the switching means being connected to a respective one or more of the series capacitors of the display element. For example, in the case where the switching means comprise TFTS, the output of one TFT may be connected to two series capacitors, the output of another TFT connected to one or more other series capacitors and so on. Possibly a different TFT could be provided for each series capacitor. While the provision of additional TFTs would complicate construction of the display device to some extent, particularly in the latter example where the number of TFTs corresponds to the number of sub-elements of the display element, the arrangement does offer an important advantage. In the case of a single TFT being associated with a display element, failure of the TFT results in catastrophic failure of the element. When, on the other hand, a plurality of TFTs are used as described, failure of one TFT, or perhaps even more than one, does not result in catastrophic failure of the display element and the element may still be used to some effect. The probability of the plurality of TFTs failing is very remote.

Switching means other than thin film transistors may be employed such as, for example MIM (metal-insulator-metal) or diode thin film structures.

The other substrate of the display device may carry a common electrode or a number of separate electrodes in known manner.

BRIEF DESCRIPTION OF THE DRAWING

A matrix display device, and in particular a matrix liquid crystal display device, in accordance with the invention will now be described, by way of example, with reference to the accompanying drawings in which.

DESCRIPTION OF THE PREFERRED EMBODIMENTS

Figure 1:
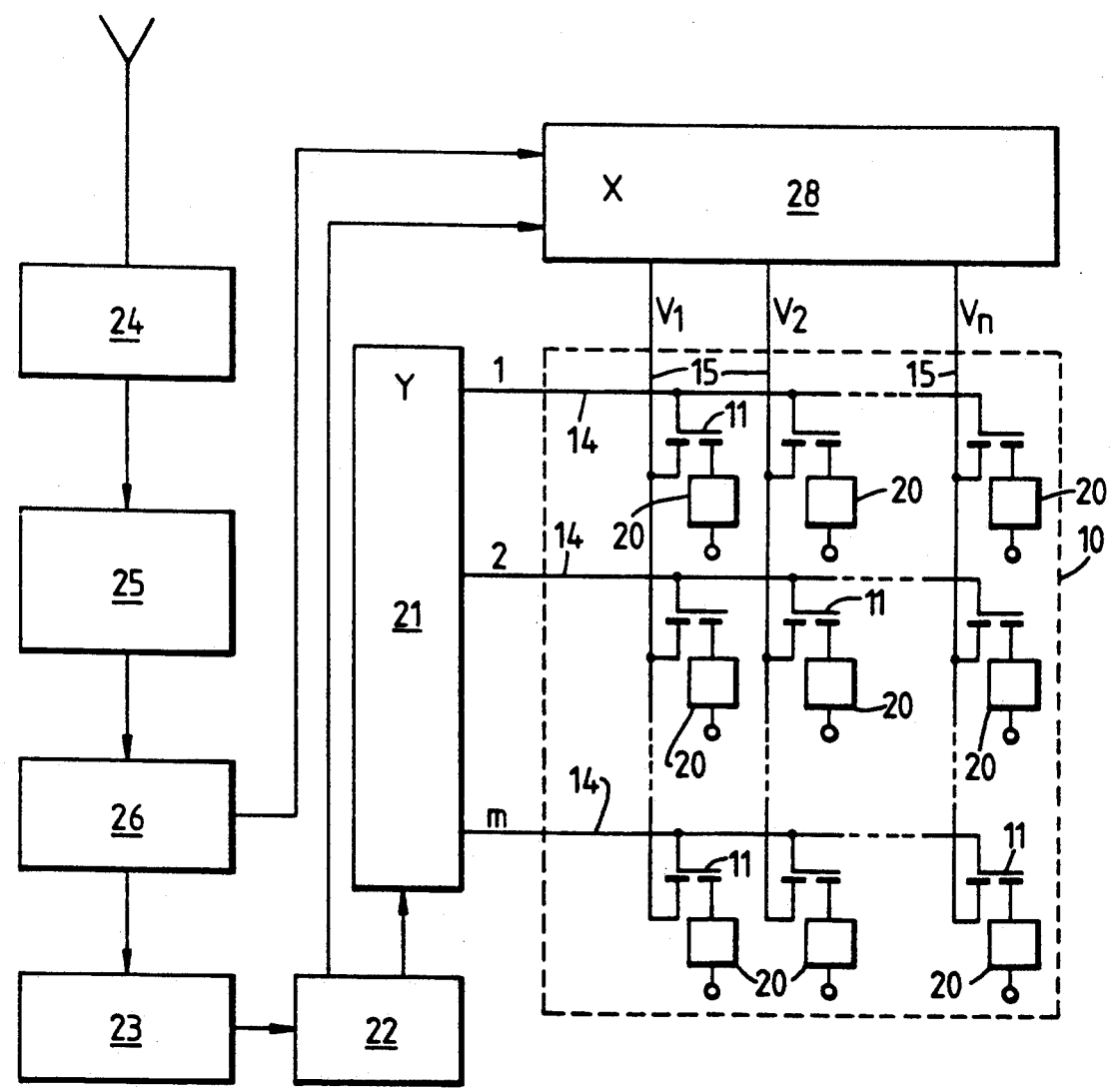
FIG. 1 is a simplified block diagram of a liquid crystal display system suitable for displaying TV pictures and including a colour liquid crystal display panel having a matrix of display elements.

Referring to FIG. 1, there is shown schematically a block diagram of a LCD-TV display system including a display device according to the invention which in this particular embodiment comprises an active matrix addressed liquid crystal display panel 10. The panel 10 consists of m lines (1 to m) with n horizontal display (picture) elements 20 (1 to n) in each line. In practice, the total number of display elements (m×n) in the matrix array may be 100,000 or more. Each display element 20 has an associated amorphous silicon thin film transistor 11 acting as a switching element. The gates of all the TFTs in each line are connected to a row (Y) electrode 14 and the source electrodes of each TFT in a column are connected to a column (X) electrode 15, there being m row electrodes 14 and n column electrodes 15. The drains of the TFTs 11 are connected to respective electrodes of the display elements in a manner which will be described. A common counter electrode for the display elements is carried by a substrate spaced from the substrate carrying the TFTs and the associated electrodes of the display elements with liquid crystal material disposed therebetween. The liquid crystal material modulates light according to voltage applied thereacross. Colour fitters in registration with the display elements produce a colour display using tri-colour additive principles.

Line addressing of the matrix array of display elements 20 is achieved by applying a gate voltage to a row electrode 14. This turns on every TFT in that row of the matrix. The row electrodes are sequentially addressed to provide line scanning. Using one line at a time addressing each transistor is switched on for a time $T_l$ during which video information is transferred to display elements. During the remainder of the field time Tf (Tf being approximately equal to $m.T_l$) the transistor are off and their function is to isolate their associated display elements so that the video voltage across these display elements is maintained by virtue of the natural capacitance of each such liquid crystal display element ($C_{LC}$). liquid crystal material is effectively directly driven, and thus any number of lines could be addressed, depending on the switching characteristics of the TFT.

As can be seen in FIG. 1, the Y, row, electrodes 14 are driven by a digital shift register 21 supplied with regular timing pulses from a clock circuit 22 which is fed with line synchronising pulses from a synchronisation separator 23 derived from the incoming signals via a tuner 24, IF circuit 25 and video amplifier 26.

Video information signals are supplied to the X, column, electrodes 15 simultaneously from an analogue shift register circuit 28, comprising one or more shift registers, supplied with video signals from the video amplifier 26 and timing pulses from the clock circuit 22 in synchronism with line energisation. The shift register circuit samples the corresponding line in the video signal and places the appropriate voltages on the X electrodes 15 to the TFT source electrodes. A line of "on" TFTs form conducting paths between the X electrodes 15 and the display element electrodes connected to the TFT drains so that the liquid crystal elements of the line charge up to the source voltages. When the Y, gate, electrode 14 voltage falls, the line of TFTs turns off. This isolates the liquid crystal display elements and charge is stored on the elemental capacitors. The display elements thus stay in the state into which they were driven, determined by the voltage, $V_{LC}$, across them, until the next time their associated TFTs are turned on by appropriate energisation of the respective Y electrode 14.

The purpose of the X shift register circuit 28 is to provide serial to parallel conversion appropriate to the line at a time addressing of the panel 10. For a full resolution TV display, two shift registers would be needed. During a line time, video information for one line is shifted into one register white at the same time the video information of the previous line is transferred from the other register to the Y electrodes 14 of the panel. During the next line time, the first register is emptied into the panel and the second register is refreshed with video information for the next line. In a half vertical resolution TV display, both fields constituting one TV frame are transferred to the same set of picture elements (i.e. fields are shown superimposed rather than being interlaced as in, for example, a CRT TV display). Hence, the polarity of the video signal supplied to the shift register 28 conveniently is changed at the end of every field in order to reduce the possibility of degradation of the liquid crystal material.

The above description of a liquid crystal TV display system using an active matrix addressed liquid crystal display panel and its general operation has been kept deliberately simple. Similar TV display systems are now very well known and have been widely described and documented elsewhere. For this reason, it is thought unnecessary here to describe in greater detail the general constructional principles and operation. For further information, reference may be made to, for example, U.S. Pat. No. 3,862,360, British Patent Specification No. 2159656 or the paper entitled "Liquid Crystal Matrix Displays" by Lechner et al, published in Proceedings of the IEEE, Vol. 59, No. 11, November 1971, pp 1566-1579.

In such known liquid crystal display panels using TFTs, each individual display element comprises a single electrode connected to the output of the TFT and carried on the same substrate as the TFT which, together with a respective portion of an opposing common electrode carried on the facing substrate, defines the display element. Differences in the displayed grey scale level, determined by the magnitude of the video signal supplied to the TFT's input, depend on the characteristics of the liquid crystal material, it being necessary for this purpose to employ a liquid crystal material having gradual switching characteristics, usually having an exponential slope, so that its transmission varies slowly with applied voltage.

In the present embodiment, however, and in accordance with the invention, each display element 20 is sub-divided into a plurality of sub-elements and comprises a plurality of electrodes rather than a single electrode. This plurality of individual electrodes in effect defines with respective sub-regions of the portion of the common electrode associated with the display element and liquid crystal material therebetween a plurality of display sub-elements. Together, the sub-elements occupy an area substantially similar to that of a conventional single display element so that there need be no loss in resolution capability. Each display element is supplied with video signals in the same manner as before via X conductors 15 and controlled by gating signals on Y conductors 14 so as to build up a picture from the display elements. However, rather than relying solely on the voltage switching characteristic of the liquid crystal material to provide grey scale levels, this is achieved instead by selective control of the number of sub-elements switched at any one time from, for example, a first state in which the material is transmissive, to a second, non-transmissive state. With most of the sub-elements of a display element in the second state, therefore, the display element is perceived by a viewer to appear relatively dark and with most of the sub-elements in the first state, the display element appears relatively light. Thus, by varying the relative numbers of the sub-elements in the first and second states, a variety of grey scale levels can be achieved using a kind of dot matrix principle.

The desired control of each sub-element in accordance with a required grey scale level is accomplished using capacitive effects. The display sub-elements, like conventional display elements, behave as capacitors. Each of the sub-elements is connected to a point to which the video signal is supplied, that is, the output of an associated TFT, via a respective series capacitor. The ratios of the capacitances of each sub-element and its respective series capacitor are predetermined and, at least for some of the series combinations, are different from one another. The series combination of a sub-element and capacitor acts in the manner of a potential divider circuit. Because the capacitance ratios of the series combinations differ, a particular video signal voltage applied to all the series capacitors at their sides remote from their associated sub-elements will, for example, result in certain ones of the plurality of electrodes attaining the necessary liquid crystal switching (threshold) voltage causing these sub-elements to change state. If the video signal voltage is progressively increased, then progressively more sub-elements are caused to change state. Conversely, if the video signal voltage is progressively decreased, then the number of sub-elements in the changed state correspondingly decreases. The numbers of changed sub-elements at any one time determines the grey scale level.

It is no longer essential therefore that the liquid crystal material has a gradual switching characteristic. The only condition on the choice of material employed for optimum results is that preferably it has a reasonably sharp switching characteristic. However, by choosing a liquid crystal material which still has some gradual switching characteristic even though perhaps sharper than usual, it is possible to achieve additional grey scale variations utilising the sub-elements' voltage/transmission curve characteristic in a manner similar to that used previously for display elements.

Figure 2:
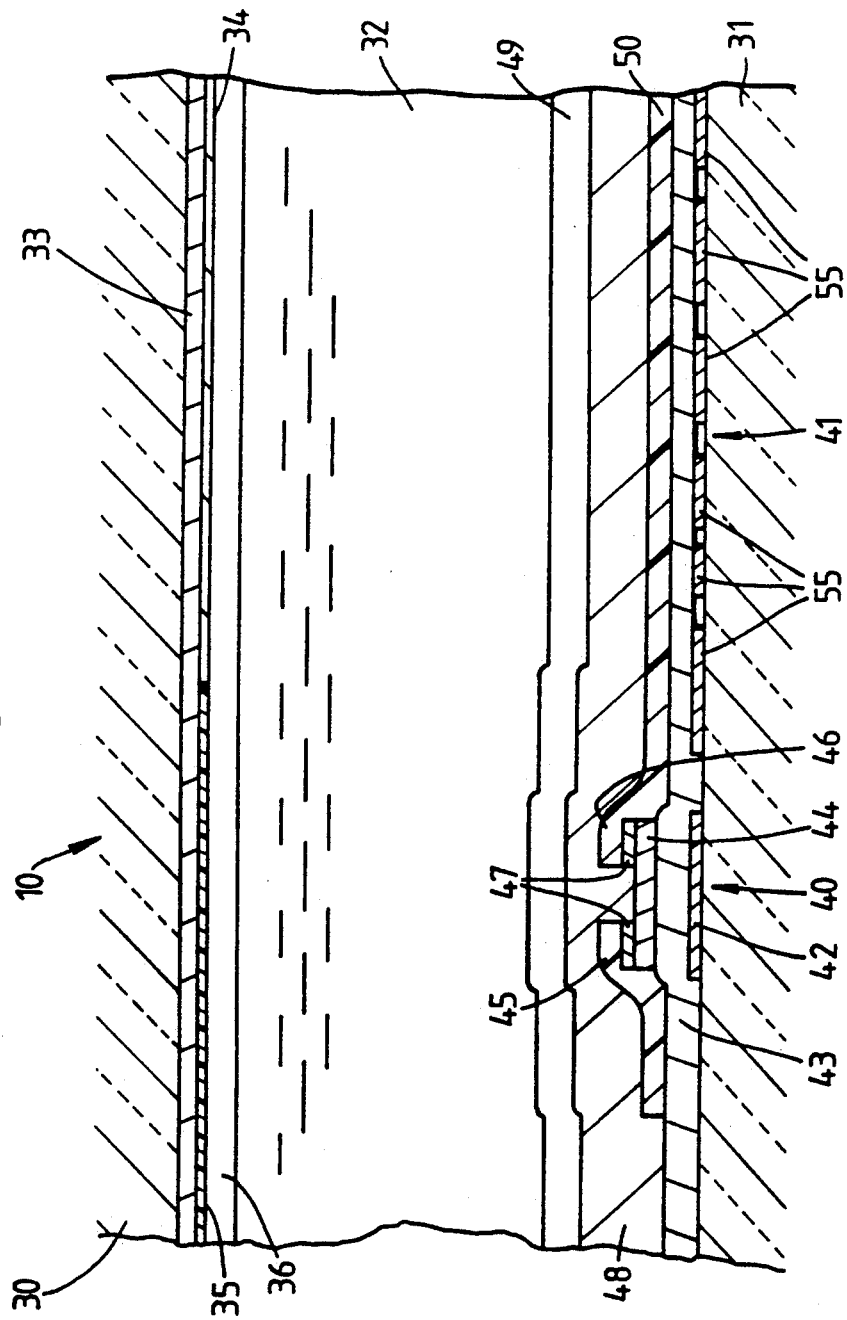
FIG. 2 is a schematic cross-sectional view through a part of an embodiment of a colour liquid crystal display panel for use in the system of FIG. 1 showing a portion of a typical one of the display elements and in accordance with the present invention.
Figure 3:
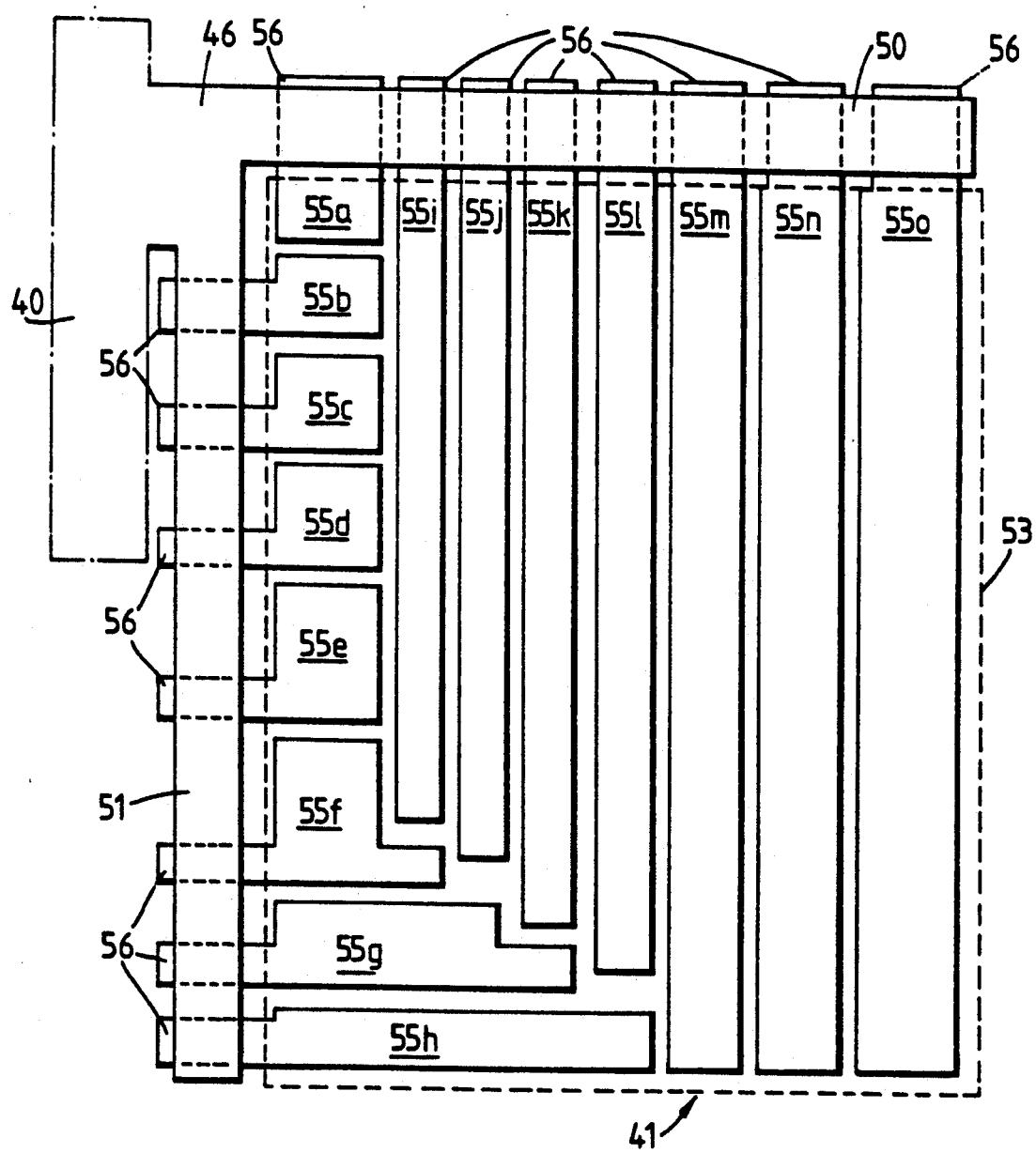
FIG. 3 is a plan schematic view showing an electrode configuration of the one display element of FIG. 2.

With regard to FIG. 2, there is shown a cross-section through a part of a typical display element of a particular embodiment of a liquid crystal panel according to the invention for the system of FIG. 1 in which each display element of the panel comprises a plurality of electrodes defining sub-elements connected in series with a respective capacitor as described above. FIG. 3 is a plan view of part of the display element shown in FIG. 2 illustrating the plurality of electrodes and their associated series capacitors of the typical display element.

Referring to FIG. 2 especially, the panel, 10, comprises two spaced apart glass substrates 30 and 31 to define a gap in which twisted nematic liquid crystal material 32 is disposed. As is customary, polarising layers (not shown) would be provided on the outer surfaces of substrates 30 and 31. The upper substrate 30 carries on its inner surface a continuous ITO (Indium Tin oxide) electrode layer 33 common to all display elements.

Over this electrode 33 are disposed discrete areas of colour fitter layers 34 and adjacent light shielding layers 35 of insulative material in the form of a matrix. The colour filter layers 34 overlie respective display elements and are arranged in groups of three adjacent filter layers of red, green and blue fitter material respectively so that the outputs from corresponding groups of three display elements can combine to give a full colour display. The layers 34 and 35 are in turn covered by an orientation layer 36 of polymer material.

The lower substrate 31 carries TFTS, together with associated electrodes of the display elements, generally designated 40 and 41 respectively. Each TFT comprises a metal gate electrode 42 deposited directly on the substrate 31, a SiN gate dielectric insulator layer 43, an amorphous silicon layer 44 overlying the gate, two, laterally spaced, n+ layers 47 on the layer 44 and source and drain electrodes 45 and 46 extending over the layers 47 in the manner shown. An insulator serving as a passivation layer 48 extends over the structure as shown. The insulator layer 48 is in turn covered by an orientation layer 49 of polymer material similar to the layer 36.

The source electrode 45 is interconnected with the source electrodes of other TFTs in the same column 15 and the gate electrode 42 is interconnected with the gates of other TFTs in the same row 14, their connections being formed integrally with the electrodes concerned.

Referring now also to FIG. 3 the drain electrode 46 of each TFT is formed with an extension conductive strip layer integrally therewith. This extension strip has two arms 50 and 51 of substantially constant width which extend at right angles to one another and alongside two adjacent sides of the display element area 53, represented in the figure by a dotted line, which, in this example, is rectangular in shape with dimensions around 350×300 micrometers.

The arms 50 and 51 are deposited over the gate insulator layer 43. Beneath this layer 43, and directly on the glass substrate 31, there is provided a plurality of separate display element electrodes 55a to 55o arranged co-planarly which together occupy the display element area 53 with only relatively small gaps therebetween and together serve to constitute one display element. Each of these electrodes 55a to 55o defines with a respective opposite portion of common electrode 33 and the liquid crystal material 32 therebetween a sub-element of the display element.

The electrodes 55a to 55o are formed with respective integral extension layers 56 which extend beneath the extension layer of the TFTs drain electrode and are separated therefrom by the insulator layer 43, the extensions of electrodes 55b to 55h passing beneath the arm 51 and the electrodes 55a and 55i to 55o passing beneath the arm 50. These electrode extensions 56 together with the overlying portions of dielectric insulator layer 43 and arms 50 and 51 constitute capacitors and it will be appreciated that these capacitors are in series connection between the drain electrode 46 of the TFT and respective ones of the capacitive display sub-elements comprising electrodes 55, liquid crystal material 32 and respective portions of electrode 33.

As can be seen in FIG. 3, fifteen electrodes 55 are provided, in effect splitting the display element into fifteen sub-elements, enabling sixteen grey scale levels to be achieved by successive switching operation of each of the sub-elements with all sub-elements in their "off" condition providing the sixteenth level.

In order to provide the appropriate visual distinctions between grey scale levels, the areas of successively switched electrodes 55a to 55o in that order, and thus the sub-elements they serve to define differ from one another and follow an exponential progression. In this way, and because of the eye's characteristic logarithmic response to brightness level variations, the areas of the sub-elements are matched to the eye's perception of linear grey scale. The capacitances of the sub-elements therefore differ correspondingly. The ratio of each sub-element's capacitance to the capacitance of its associated series connected capacitor differ in each case. Bearing in mind that the capacitance of each sub-element is dictated to a large extent by the area of its electrode 55, the required differences in capacitance ratios are accomplished by appropriately tailoring the size of the extensions 56 of the electrodes beneath the arms 50 and 51 so as to obtain the desired value of capacitance of the series capacitors in each case. Typically, these series capacitors will have a capacitance per unit area value of 10 to 20 times the capacitance per unit area of the overall capacitance of the display element.

Figure 4:
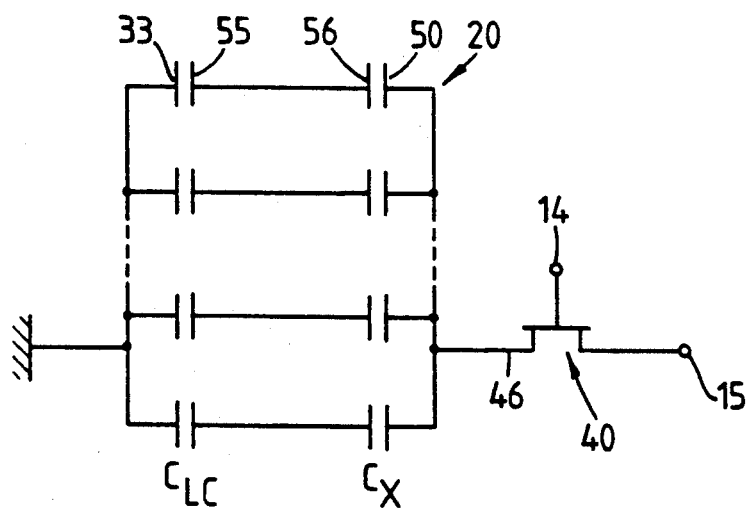
FIG. 4 illustrates diagrammatically the electrical circuit of a typical one of the display elements of the display panel of FIG. 2.

The arms 50 and 51 together with the opposing portions of electrode 33 and the liquid crystal material therebetween give rise to a certain capacitance in parallel with the sub-element capacitances whose effect tends to compensate to some extent for the smaller total display element capacitance. Any display effect which might be caused by these arms 50 and 51 during operation of the panel will be masked by the matrix light shield 35. The electrical circuit of the display element is represented in FIG. 4 where the capacitance of the sub-elements and their associated series capacitors are denoted by the references $C_{LC}$ and $C_X$ respectively. It will be appreciated that, in practice, one of the plates of the sub-element capacitors are formed by respective regions of a common layer, the layer 33.

By adding a series capacitor, $C_X$, to each sub-element, $C_{LC}$, it is achieved that a threshold voltage necessary to switch the liquid crystal material from a first state, for example in which a sub-element is transmissive, to a second state, in which the sub-element is non-transmissive, is reached across the relevant sub-elements only when the video signal present at the TFT drain electrode reaches the voltage appropriate to that grey scale level. In operation, as the voltage at the TFT drain electrode is increased, during successive fields, more of the sub-elements are switched from the first to the second state to form a grey scale.

Since grey scale level variations are achieved by appropriately switching the sub-elements between the two states, the choice of liquid crystal material is not so critical as previously, enabling greater possibilities of other properties such as viewing angle ranges. For particularly good results, the material preferably has a reasonably sharp voltage switching characteristic.

Although in the above described example, the ratios of capacitances of the sub-elements and their series capacitors are all different from one another, it would be possible for the ratios associated with two or more sub-elements to be the same so that those sub-elements concerned are caused to switch simultaneously, thus enabling two or more different sub-elements to act together in obtaining a grey scale level variation and permitting electrode patterns different to that shown in FIG. 3. The number of grey scale levels achievable can be maintained by utilising the switching characteristics of the liquid crystal material as described previously.

Figure 5:
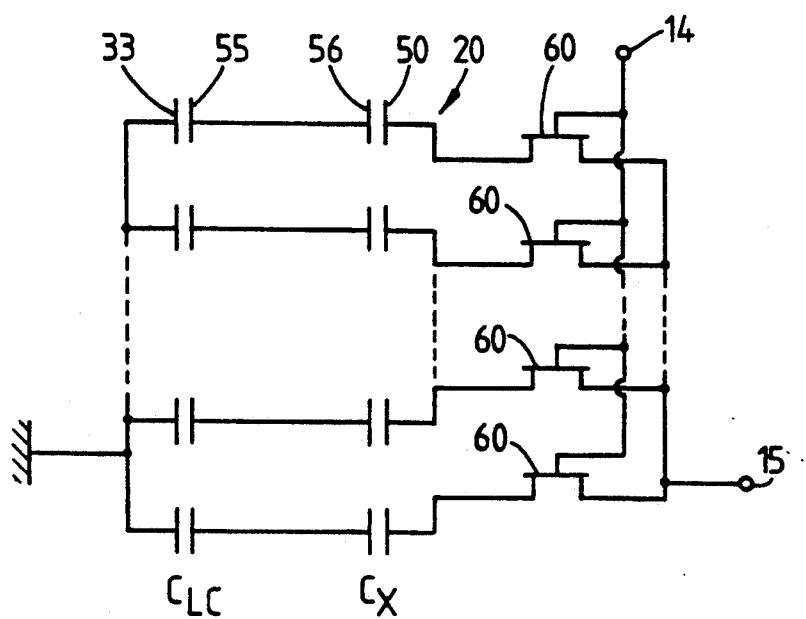
FIG. 5 illustrates diagrammatically an alternative circuit of a typical one of the display elements.

With regard to FIG. 5, there is shown the circuit configuration of a typical display element of an alternative embodiment of a display panel in accordance with the invention. In this embodiment, rather than having a single TFT driving all the sub-elements of a display element, each sub-element is driven by a respective and different TFT 60. The gates and sources of all these TFTs are connected to the same row 14 and column 15 respectively so that they receive the same gating and video signals. The operation of the display element remains as before. This arrangement has the advantage that, unlike the above-described embodiment in which failure of the single TFT would result in catastrophic failure of the display element, failure of one TFT, or perhaps even several TFTs, does not lead to complete failure of the display element as it would still be capable of providing a limited display capability. Thus yield is improved.

While a separate TFT for each sub-element gives a higher degree of redundancy, a useful degree of redundancy could be achieved more simply by providing two or more TFTs for each display element and connecting each TFT to one or more respective sub-elements. For example, one TFT could be connected to one sub-element, another TFT connected to three different sub-elements, another TFT connected to two other sub-elements and so on.

In all these possible alternative arrangements, the interconnections between the TFT drains and their associated sub-elements will, of course, entail conductive layers of a different form to that shown in FIG. 2. Although a number of TFTs have to be provided adjacent each display element, this does not necessarily mean that the area occupied by the TFTs will be unduly large compared with the area needed for the single TFT used in the first embodiment. Because the TFTs have to drive sub-elements rather than the entire display element they can be formed correspondingly smaller. In actual practice, the plurality of TFTs may comprise a commonly formed TFT structure which is split to define separate, smaller, TFTS.

I claim:

1. A matrix display device comprising a plurality of display elements arranged in a matrix and defined by respective electrodes carried on opposed substrates between which is disposed an electrically excitable display material which, together with the electrodes, exhibits inherent capacitance in operation, and in which the display elements are controlled by selectively applying voltages to the respective electrodes via respective switching means carried on one substrate, characterized in that the display element electrodes on the one substrate each comprise a plurality of separate electrodes defining a plurality of sub-elements, which separate electrodes are each capacitively coupled to the respective switching means by means of a respective series capacitor, the series capacitors each comprising an extension of the respective sub-element electrode, the overlying portion of an extension of an output electrode of the switching means, and an intervening dielectric insulator layer, and in that the ratio of the inherent capacitance of each sub-element to the capacitance of its respective series capacitor differs from one sub-element to another;

and further characterized in that the capacitance value of each series capacitor is determined by the area of the overlying portions of the output electrode extension and the extension of the sub-element electrode.

2. A matrix display device according to claim 1, in which the number of sub-elements of each display element is chosen in accordance with the number of grey scale levels to be displayed.

3. A matrix display device according to claim 1 wherein, in addition to the plurality of sub-elements, each display element includes one or more further sub-elements which are capacitively coupled by means of a respective series capacitor to the switching means with the ratios of the capacitances of the one or more further sub-elements and their respective series capacitors being the same as one or respective ones of those ratios associated with the plurality of sub-elements.

4. A matrix display device according to claim 1, wherein respective areas of the plurality of electrodes of each display element vary with respect to one another in accordance with the grey scale levels to be displayed.

5. A matrix display device according to claim 4, in which the respective areas of the electrodes of successively switched sub-elements have an approximately logarithmic relationship.

6. A matrix display device according to claim 1, in which the series capacitors of each display element are arranged adjacent first and second orthogonally disposed edges of the display element.

7. A matrix display device according to claim 1, in which the series capacitors associated with the sub-elements of each display element are connected to the output electrode of a common switching means.

8. A matrix display device according to claim 7, in which the plurality of electrodes of each of the display elements are arranged in a planar array and are each connected to a respective conductive layer constituting part of their series capacitor and in that the output electrode of the switching means is connected to a conductive strip which extends over the conductive layers associated with the plurality of electrodes and is insulated therefrom, the conductive layers and the respective overlying portions of the conductive strip constituting the series capacitors.

9. A matrix display device according to claim 8, in which each of said conductive layers is formed as said extension of the sub-element electrode and integrally therewith.

10. A matrix display device according to claim 8 or 9, in which each display element is substantially rectangular in shape and in that first and second conductive strips for each display element extend adjacent to first and second orthogonal edges of the display element.

11. A matrix display device according to claim 1, in which a plurality of separate switching means are provided for each display element, the output electrodes of the switching means being connected to a respective one or more of the series capacitors of the display element.

12. A matrix display device according to claim 11, in which the plurality of electrodes of each of the display elements are arranged in a planar array and are each connected to a respective conductive layer constituting part of their series capacitor and located adjacent to the periphery of the display element, and in that the output electrodes of the plurality of switching means are connected to respective conductors which extend over a respective one or more of said conductive layers and are insulated therefrom, the conductive layers and the respective overlying portions of the conductors constituting the series capacitors.

13. A matrix display device according to claim 12, in which the series capacitors of each display element are arranged adjacent an edge of the display element.

14. A matrix display device according to claim 1, in which the display material comprises liquid crystal material.

15. A matrix display device according to claim 1, in which an electrode common to all display elements is carried on the other one of said opposed substrates.

16. A matrix display device as claimed in claim 4 wherein the voltages selectively applied to the respective electrodes are DC voltages in which the amplitudes thereof determine the number of sub-elements energized and thereby the grey scale level of the respective display elements.

17. A liquid crystal display device comprising:

a plurality of display elements arranged in a matrix and defined by respective electrodes carried on first and second opposed substrates between which is disposed an electrically excitable liquid crystal display material which, together with the electrodes, exhibit inherent capacitance, each of the display element electrodes on the first substrate comprising a plurality of separate electrodes defining a plurality of sub-elements, a plurality of switching means on said first substrate for selectively applying DC voltages to respective ones of said separate electrodes on the first substrate in a sequential row-by-row process and in a manner whereby between row selection periods the switching means electrically isolate their respective sub-elements from any externally applied sustaining voltage, and a plurality of capacitors each of which is serially connected with a respective one of said electrodes to a respective switching means to form with respective sub-elements a plurality of series connected capacitive voltage dividers in which the ratio of the inherent capacitance of each sub-element to the capacitance of its respective series capacitor differs from one sub-element to another thereby to establish different voltage operating thresholds for at least some of the sub-elements of each display element.

18. A display device as claimed in claim 17 wherein for each display element a single respective switching means is coupled to all of its separate electrodes via is respective series capacitors thereby to form a plurality of parallel connected capacitive voltage dividers controlled by their respective single switching means.

19. A display device as claimed in claim 17 wherein said respective electrodes of each display element comprise a first plurality of parallel rectangular conductors extending in one direction with at least some of said conductors having different areas, and a second plurality of parallel rectangular conductors extending orthogonal to said first plurality of conductors and with at least some of said second plurality of conductors having different areas.

20. A matrix display device comprising: a pair of spaced substrates sandwiching a layer of electrically excitable display material to produce a display effect, electrodes carried on opposing surfaces of the substrates which, together with respective portions of the layer of display material, define a plurality of display elements arranged in a matrix and which exhibit inherent capacitance in operation, the display elements being connected to respective switching means carried on one substrate and disposed laterally adjacent to respective display element electrodes on that substrate, and drive means connected to the switching means and operable to selectively control the switching means so as to apply voltage signals to the display elements thereby to produce a display effect, wherein the display element electrode on the one substrate each comprise a plurality of separate electrodes defining a plurality of display sub-elements, which separate electrodes are arranged in a planar array and are each capacitively coupled to the respective switching means via a respective series capacitor carried on that substrate, the series capacitors each comprising an extension of the respective sub-element electrode, the overlying portion of an extension of an output electrode of the switching means, and an intervening dielectric insulator layer, and in which the area of the overlying portions of the output electrode extension and the extension of the sub-element electrode for each of the series capacitors is selected in relation to the inherent capacitance of the respective sub-element such that the ratio of the inherent capacitance of each sub-element to the capacitance of its respective series capacitor differs from one sub-element to another whereby, in response to a voltage applied to a display element via the switching means, the voltage at the sub-elements differs from one sub-element to another with the number of sub-elements producing a display effect being determined in accordance with the amplitude of the applied voltage.

* * * * *